Figure 1:
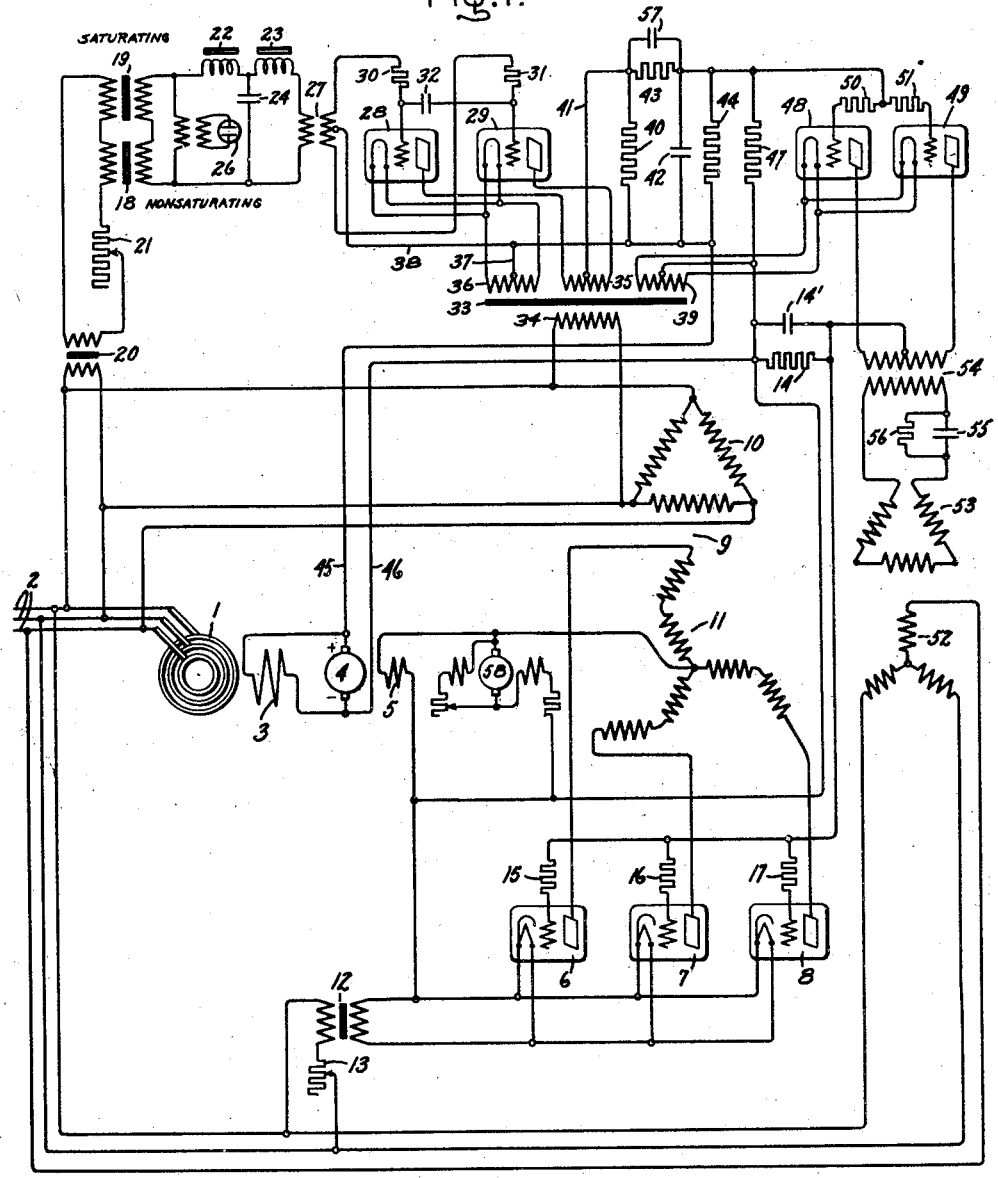

Oct. 3, 1933.  G. W. GARMAN  1,928,686
REGULATING SYSTEM
Original Filed Nov. 26, 1930   2 Sheets-Sheet 2

Inventor:
George W. Garman.
by Charles V. Tulla
His Attorney.

Patented Oct. 3, 1933

1,928,686

UNITED STATES PATENT OFFICE 1,928,686

REGULATING SYSTEM

George W. Garman, Scotia, N. Y., assignor to General Electric Company, a corporation of New York Application November 26, 1930, Serial No. 498,417
Renewed February 10, 1933

14 Claims. (Cl. 171—119)

My invention relates to electrical regulating systems and more particularly to regulating systems employing electric discharge devices or electric valves for controlling an electrical characteristic of a dynamo-electric machine or circuit.

Various regulating systems employing electric discharge devices have been proposed in the past for regulating the voltage or other electrical condition of a machine or circuit. Many of these regulating systems are very elementary in character and are incapable of producing the fine degree of regulation required for stable operation of a machine or circuit under the various conditions of operation encountered in practice, particularly in connection with polyphase alternating current systems. Electrical regulators when associated with a polyphase system are usually connected to the system in such a manner that response to the regulated condition is obtained from only one phase. So long as the system is balanced the operation of the regulator is satisfactory but when the system becomes unbalanced the regulator may or may not respond in the proper manner depending upon how the particular phase to which the regulator is connected may be affected by the unbalanced condition.

In a copending joint application of Alan S. Fitzgerald and myself, Serial No. 498,416 filed November 26, 1930, for Regulating systems, and assigned to the assignee of the present application, there is described and claimed a regulating system employing electric discharge devices for controlling an electrical characteristic of a polyphase machine or circuit in which protection is provided for unbalanced conditions in the circuit to be regulated. In this copending application the voltage determining circuit is connected to one phase and controls the anode current of an amplifier comprising two electric discharge devices having cathodes connected to be heated from the unregulated phases. If either or both of these unregulated phases is reduced to zero the heating of the cathodes of the amplifier is reduced to such an extent that loss of emission and therefore loss of control of the electric discharge device controlling the excitation of the polyphase machines results. The electric discharge device controlling the excitation circuit is arranged in such a manner that loss of control causes maximum output and full field excitation. This particular arrangement was not found to be effective under all conditions of unbalance that might be encountered in practice particularly in case of unbalance due to single phase short circuits in which the reactance was relatively high and the voltage of the particular phase short circuited did not go to zero or a value substantially less than the normal balanced value.

It is an object of my invention to provide a new and improved regulating system employing electric valves which will effect proper regulator action when utilized in connection with a polyphase dynamo-electric machine or circuit irrespectively of whether the electrical conditions are the same or different in each phase.

In accordance with one embodiment of my invention I employ a single phase voltage determining circuit which indicates variations in the electrical characteristic to be regulated. This voltage determining circuit varies the anode current of electrical discharge devices which in combination with the voltage determining circuit is analogous to the main regulating coil of an electro-mechanical regulator and constitutes the primary control unit of the regulating system. The anode current from the primary control unit is used to control an amplifier comprising electric discharge devices, the anode current of which controls means for controlling the current output of power electric valves connected to energize the excitation winding of a dynamo-electric machine or control the circuit to be regulated. The source of potential for the anode circuit of the amplifier is supplied in accordance with a harmonic voltage proportional to the fundamental of the different phase voltages of the circuit to be regulated so as to effect proper regulation during balanced or unbalanced conditions. In another embodiment of my invention I provide rotatable means for controlling the electric valve and provide a polyphase dynamo-electric means which is sensitive to both balanced and unbalanced conditions in the circuit to be regulated for controlling said rotatable means and thereby effect proper control of the electric valve under the various conditions of operation encountered in practice.

The novel features which I believe to be characteristic of my invention are set forth with particularity in the appended claims. The invention itself, however, both as to organization and method of operation, together with further objects and advantages thereof, will best be understood by reference to the following description taken in connection with the accompanying drawings in which Fig. 1 is a diagrammatic representation of a regulating system in which static means are employed for obtaining proper regulation under unbalanced conditions, and Fig. 2 is a diagrammatic representation of another embodiment of my invention in which movable means are employed to obtain proper regulation under unbalanced conditions.

Figure 2:
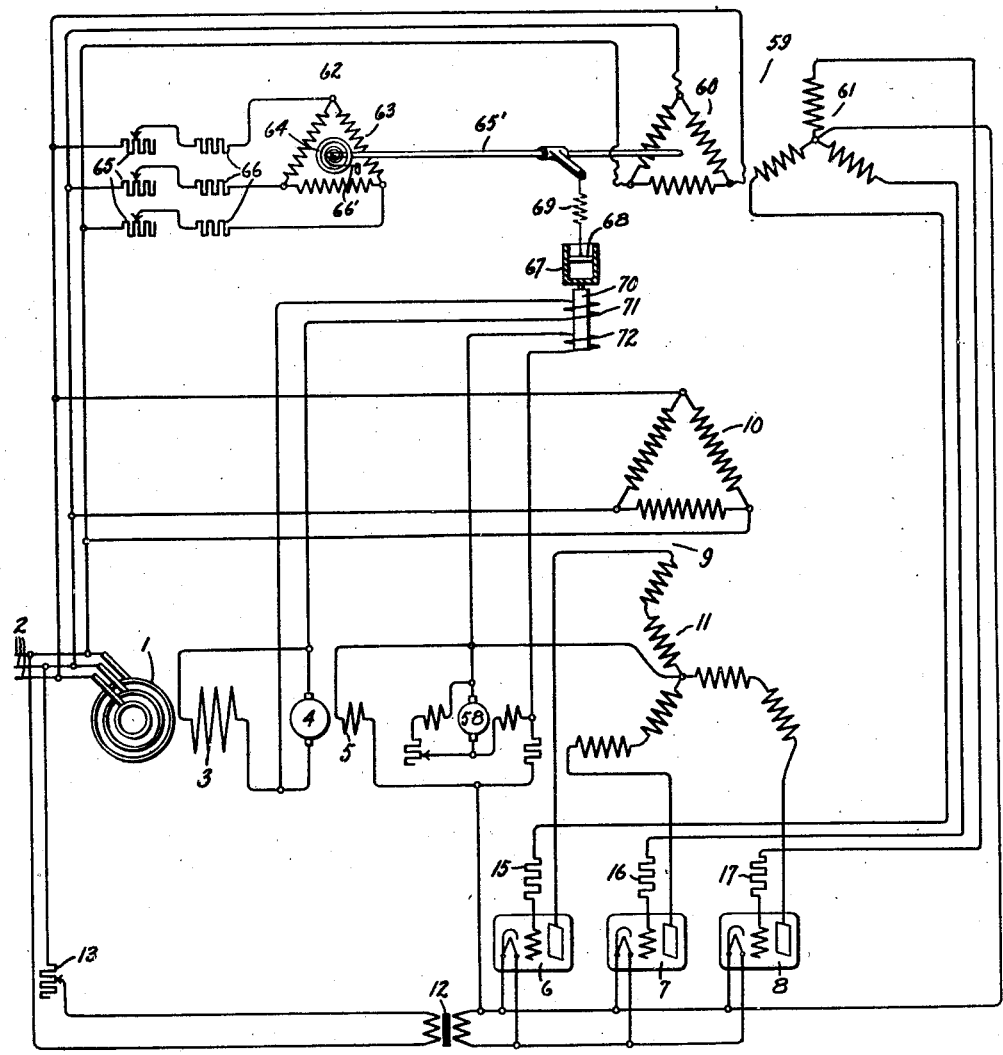

Referring to Fig. 1 of the drawings, 1 denotes a dynamo-electric machine shown as a synchronous three phase alternator which is connected to a power circuit 2. The alternator 1 is provided with a field winding 3 which is connected to be supplied with an exciting current from a source of direct current such as a direct current generator or exciter 4. The exciter 4 is provided with a field winding 5 which is connected to be energized through electric discharge devices or electric valves 6, 7 and 8 from the alternating current terminals of the alternator or any other convenient alternating current source. These electric valves are each provided with an anode, a cathode, and a control electrode or grid and are preferably of the gaseous or vapor electric type or any form of discontinuous control type of valve because of the greater current capacity of this type as now developed as compared to electric discharge devices or electric valves of the pure electron discharge type in which the current flowing through the valve is continuously controlled by the potential upon the grid. The term discontinuous control type of electric valve is intended to mean that type in which the starting of current in the valve is determined by the potential of its control grid but in which the current through the valve may be interrupted only by reducing the anode potential below its critical value. Transforming means 9 are provided for supplying current from the circuit 2 through the valves to the field winding 5. This transforming means comprises a primary winding 10 preferably delta connected and a secondary winding 11 preferably zigzag star connected for eliminating direct current magnetization of the transformer cores. The anodes of the valves 6, 7 and 8 are connected respectively to different free terminals of the respective phase windings of the secondary winding 11. The neutral point of the star connected secondary windings is connected to one side of the field winding 5 and the other side of the field winding 5 is connected to the cathodes of the valves. The cathode of each valve is connected to the heating source through any suitable means and as illustrated a transformer 12 is connected across one phase of the alternator terminals to energize the cathodes of each valve. An adjustable resistor 13 is connected in series with the primary winding of transformer 12 for adjusting the value of the heating current. The control electrode or grid of each valve is connected to a grid controlling means illustrated as a resistor 14 through grid resistors 15, 16 and 17. A condenser 14' is connected across the resistor 14 for smoothing out pulsations in the current transmitted through the resistor. Control of the valves is obtained by so controlling the grid potential of the valves that the valves pass current during an entire cycle or predetermined number of cycles and block current during a succeeding cycle or predetermined number of cycles. As illustrated in the drawings, a unidirectional potential is obtained from the resistor 14 which supplies a potential in one direction to make the valves conducting and supplies a different potential in magnitude or polarity to prevent the current from starting through the valves.

In order to effect the control outlined above it is necessary to provide means to vary the potential drop across the resistor 14 in accordance with variations in the voltage or other electrical characteristic of the machine or circuit to be regulated. A change in voltage corresponding to the change in the voltage to be regulated is produced by means of a balance or bridge circuit and a controlled rectifier. The balance circuit performs the same function as the ordinary type of balance bridge circuit and comprises two transformers 18 and 19. Transformer 19 is arranged to saturate with relatively low currents and transformer 18 is arranged to operate below saturation. The primary windings of these transformers are connected in series and to the alternator terminals through a step-down transformer 20. The secondary windings of these transformers are also connected in series. It will be apparent that for one particular value of current the voltage across the primary winding of each transformer is the same and if these windings are connected in series and in the proper phase relationship no voltage will exist across the terminals of the secondary windings. However, if that particular value of current is changed the circuit will be unbalanced and a difference voltage will exist. It will also be apparent that this difference voltage is a function of the amount that the current is off balance, and that the phase relationship of the difference voltage depends upon whether the current is above or below the balance value. In one case the difference voltage will be approximately in phase with the line voltage and in the other case it will be approximately 180 degrees out of phase with the line voltage. Since the reactance of the transformers varies with frequency it is necessary to utilize some means for preventing the balance point from shifting for different frequencies. An adjustable resistance 21 is connected in series with the primary windings of the transformers for reducing the frequency error and in addition it affords an easy and simple means of changing the balance points so that the regulator will regulate for different line voltages. If the resistance in the circuit is increased the current will decrease, therefore in order to bring the current back to the balance value it is necessary to hold a higher line voltage. Obviously, the converse will reduce the regulated line voltage.

In the description of the balance circuit, immediately preceding, it was stated that for a given balance current no voltage difference existed. That statement was not strictly acurate because a third or higher harmonic is present in the current wave, due to saturation in the saturating transformer. Therefore, in order to reduce the effect of this third harmonic or higher harmonics and at the same time make the circuit only responsive to the fundamental voltage change, a low pass filter is used with a cutoff frequency of the order of 80 cycles. This filter may be of any suitable type known in the art and by way of example I have illustrated a typical network comprising two reactors 22 and 23 connected in series with the circuit from the secondaries of the bridge transformers and a condenser 24 connected to the junction between said reactors and to the other side of the transformer secondary circuit. In order to keep the difference voltage from the bridge within safe limits in case the generator voltage goes to a very high value due to sudden loss of load, I connect an impedance in parallel to the series connected secondary windings of the balance circuit which is arranged to have a high impedance for difference voltages below a predetermined value and a relatively low impedance for any difference voltage above the predetermined value. As illustrated, I employ a transformer having its primary winding connected in shunt to the balance circuit transformer and having its secondary winding connected to a glow tube 26. The glow tube might be connected directly across the balance circuit transformer secondary windings but it is more convenient to use a step-up transformer because of the range of difference voltage and the usual characteristics of the readily available glow tubes. The glow tube is arranged to break down and pass current above a critical voltage and thereby prevent an abnormal voltage condition or phase modification of the voltage derived from the filter circuit.

To increase the sensitivity of this circuit it is preferable to use a high ratio transformer 27 to step up this difference voltage. It has been found that an amplification of one to twenty-five or one to fifty is satisfactory. It must be clearly understood that the gain in sensitivity is obtained not by increasing the magnitude of the difference voltage but by increasing the change in the difference voltage. That is, if there is a change of one volt produced in the balance circuit, and neglecting any loss in the low pass filter circuit, for every volt change in the line voltage, either a twenty-five volt or a fifty volt change will be produced in the secondary winding of the transformer 27. The secondary winding of this transformer is connected to two controlled rectifiers 28 and 29 preferably electric discharge devices of the high vacuum type. These electric discharge devices are each provided with an anode, a cathode and a control electrode or grid. The grids of the electric discharge devices 28 and 29 are connected to be energized from the difference voltage of the secondary winding of transformer 27 thereby controlling the anode current of these tubes in accordance with variations in the line voltage. The impedance of the grid circuit of the discharge devices depends upon the grid voltage. When it is negative the impedance is usually very high, in the order of megohms, but if the grid is positive the impedance falls off very rapidly and will perhaps be of the order of thousands of ohms. Therefore, if full sensitivity and amplification of the balance circuit and grid transformer is to be obtained it is necessary to work into a high impedance and the grid must therefore, be negative. In order to increase the sensitivity and amplification of this part of the circuit it has been found preferable to insert resistors 30 and 31, each of the order of 400,000 ohms, in series with each grid. A condenser 32 is connected between the grids for the purpose of reducing oscillations and limiting the voltage across transformer 27.

The anode potential is obtained from the line voltage through a transformer 33 provided with a primary winding 34 and a secondary winding 35 having opposite terminals connected to different anodes of the respective discharge devices. The primary winding 34 is connected to be energized in accordance with the line voltage. An additional secondary winding 36 is provided for furnishing heating current to the cathodes of the discharge devices. This secondary winding is provided with a mid-tap which is connected by means of conductors 37 and 38 to the mid-tap of the secondary winding of transformer 27, thereby completing the cathode-grid circuit. A third secondary winding 39 is also provided for furnishing heating current for the cathodes of additional electric discharge devices to be described presently. Due to the amplification of the various parts of the circuit there is a large change in the anode current of the discharge devices 28 and 29 with a small change in line voltage. This change in anode current manifests itself as a change in voltage across the resistance 40 connected in series relation with the anode circuit of the discharge devices 28 and 29 by means of conductors 38 and 41. The circuit is so arranged that when the line voltage drops a small amount there is a large increase in voltage across resistor 40.

In order to prevent the regulator from overshooting, it is desirable to provide damping means performing the analogous function of the dashpot on the alternating current coil lever of a Tirrill type of regulator. The damping is accomplished by charging a condenser 42 through a high resistance 43 by the voltage appearing across resistance 40. The size of the condenser and the resistance through which the condenser is charged is chosen of such a value that the time constant is relatively large. To change the damping effect it is therefore, merely necessary to change the value of the charging resistor.

If the regulator is used to regulate the voltage on a system in which the load is above the steady state limit it has been found that the voltage has a tendency to hunt soon after the steady state limit is passed and that the voltage has a rising characteristic; the decrease during each oscillation being less than the increase. In order to avoid this condition a resistance 44 is connected across the damping condenser 42 so that the rising characteristic is reduced to a minimum within the operating limit of the regulator.

The control circuit described so far gives a voltage across the resistor 44 which determines the voltage which is to be maintained constant. If this voltage were applied directly to the grids of the valves 6, 7 and 8 and cause these valves to pass current when the line voltage was below a predetermined value and block current when the line voltage was above a predetermined value it would be ineffective due to hunting. This hunting is inherent in the regulation of an alternator and is caused primarily by the self induction of the alternator field winding. Due to the self induction of the alternator field the alternator voltage with the control just described would continue to increase for a time after the electric valves open and continue to decrease after the electric valves close resulting in voltage oscillations having a high amplitude. It is, therefore, necessary to compare the change in alternator voltage with some electrical quantity which is a definite and continuous function of the excitation required by the alternator at normal voltage for any given load condition. The voltage of exciter 5 is such a quantity and is compared with the voltage appearing across the resistor 44 by means of conductors 45 and 46. The time constant of the direct current circuit is relatively small so that as the exciter voltage varies the difference in the two voltages is impressed across a resistor 47 which in turn is used to control an amplifier circuit illustrated as comprising two electric discharge devices 48 and 49 each having an anode, a cathode, and a grid. The grids are connected through grid resistors 50 and 51 to one side of the resistor 47.

In accordance with my invention the anode potential supply is obtained from the power circuit 2 in order to control the anode current in accordance with a harmonic voltage proportional to the fundamental of the different phase voltages of the circuit to be regulated so as to effect proper regulation during unbalanced conditions.

As illustrated, this means comprises essentially a polyphase iron core transformer having a primary winding 52 and a secondary winding 53 which is open mesh connected or as illustrated for a three phase circuit is open delta connected. The primary winding 52 is star connected and the transformer is so designed that its magnetizing current at least partially saturates its core. The open delta terminals of the secondary winding 53 are connected to the primary winding of an anode potential transformer 54 which has its secondary winding connected respectively to the anodes of the valves 48 and 49. A condenser 55, which may or may not be adjustable as desired, is connected in series relation with the open delta connected winding 53. A resistor 56 is connected across the condenser for purposes of adjustment. Although the voltage across the opening of the open delta connected secondary winding 53 may be made to operate satisfactorily when directly connected to the primary winding 54, improved operation is secured through the adjustment of condenser 55 and resistance 56 so as to partially neutralize the third harmonic inductive reactance of the operating coil circuit. This has the double advantage of making the impedance of the circuit low with respect to the third harmonic current and high with respect to a current of fundamental frequency which might tend to flow in the circuit under unbalanced conditions.

Under balanced voltage conditions of alternator 1 each phase winding of the secondary winding 53 will have induced in it a voltage which is numerically equal to the voltage induced in each of the other phase windings but which makes a phase angle of 120 degrees with each of the other voltages. However, as the core of the transformer becomes magnetically saturated during at least the peaks of the cycle of the impressed voltage the flux wave will be flat topped even if the impressed voltage is sinusoidal. Each of the phase voltages of the secondary winding 53 may therefore be considered as comprising two component sinusoidal voltages of fundamental and third harmonic frequencies, respectively. As the fundamental frequency components in each phase winding are in phase with their respectively resultant phase voltages, it is clear that their vector sum around the delta is zero. The third harmonic components in each phase winding are however all in phase so that their vector sum around the delta is equal to their arithmetical sum. It thus follows that there is a third harmonic voltage which when the system is balanced is made up of three equal in-phase components tending to produce a circulating current in the delta which appears across the opening in the delta. There may be other higher odd harmonics but their effect is negligible. This is especially true as the delta loop has part of its third harmonic inductive reactance neutralized by the condenser.

As the magnitude of each third harmonic voltage is proportional to the magnitude of its actual phase voltage, it follows that for balanced conditions the third harmonic voltage across the opening in the delta varies in proportion to variations in line voltage. For balanced conditions, therefore, the third harmonic voltage is an index of the line voltage and it may be applied to the control circuit of the regulating system and as illustrated in the anode circuit of the amplifier control.

For unbalanced conditions such as a single phase short circuit the voltage of one phase and consequently the magnitude of the third harmonic which is proportional to it will decrease with the result that the total third harmonic voltage across the opening in the delta will decrease since the total voltage is equal to the arithmetical sum of all of the third harmonic voltages. This third harmonic voltage under the assumed conditions will act in the proper manner to decrease the anode current of the amplifier and thereby cause an increase in the excitation of the regulated machine in response to unbalanced conditions in the main circuit.

Except for very low loads the circuit as outlined will have a tendency to hunt because of the high damping of the voltage determining voltage circuit. In order to overcome this disadvantage and at the same time take care of sudden changes in load, in particular above the steady state limit, a condenser 57 is placed across the resistance 43 in the damping circuit. This condenser has the function that for small changes in the difference voltage the time constant is reduced sufficiently to cause the exciter voltage to change immediately to the proper value. The function of the condenser is analogous to a spring between the dashpot and the plunger of the alternating current coil lever of the Tirrill type of regulator.

It is desirable to have the regulating range of the regulating system from zero exciter armature voltage to the normal value for normal conditions. Zero exciter armature voltage is obtained by bucking down the normal residual exciter excitation by means of a sub-exciter 58. The excitation due to the valves 6, 7 and 8 is in opposition to that obtained from the sub-exciter so that for normal operation the valve output will over-power the excitation due to the sub-exciter. However, for those conditions in which an exciter armature voltage is desired which is below residual value, particularly for synchronous condenser operation, the valve output is nearly cut off and the sub-exciter over-powers the residual exciter field and the residual valve output, thereby giving the desired value of exciter armature voltage.

In operation the average value of the output current of valves 6, 7 and 8 is varied. Suppose for example, that the valves are allowed to pass current for 10 cycles and then are shut off for 10 cycles, this action being repeated indefinitely. It is quite obvious that if the build-up and build-down rates are the same, that the average value of the excitation will be 50% of the value that would be obtained if the valves pass current continuously. Thus by varying the relative duration of the time during which the valves are passing current to the time which they are shut off, the average value of excitation can be controlled. This is exactly the method of operation of the regulating system hereinbefore described.

The operation of the embodiment of my invention illustrated in Fig. 1 of the accompanying drawings is as follows: It will be assumed that the alternator is being driven by a suitable prime mover and that the exciter residual voltage is sufficient to effect building up of the alternator voltage. At a voltage below the voltage to be maintained the difference voltage is arranged to be of such magnitude and phase relation as to increase the grid potential of the discharge devices 28 and 29 in a positive direction so that the anode current of these devices is increased and a unidirectional voltage is obtained across the resistor 40 which varies inversely with the alternator voltage. That is, as the alternator voltage increases toward the normal value, the potential drop across resistor 40 decreases. The voltage across the resistor 40 and consequently the voltage across resistor 44 under the low voltage condition is arranged to be greater than the exciter voltage which is in series opposition therewith. The polarity and magnitude of this resultant voltage is such as to bias the grids of the amplifier discharge devices 48 and 49 in a negative direction so as to make the anode current and consequently the voltage drop across the control resistor 14 a minimum. Under this condition the valves 6, 7 and 8 are arranged to be full on. As a result the field excitation is increased and the exciter voltage is increased to that value required for normal voltage. Just as soon as the exciter voltage attains the normal value the resultant voltage applied to the grids of the amplifier discharge device decreases the negative bias or increases the grid potential in a positive direction so that the anode current of these devices increases. As a consequence the voltage drop across the resistor 14 increases in a negative direction to shut the valves off.

When the valves shut off the exciter voltage starts to decrease and the amplifier grid potential changes so as to put the valves full on again. The result is that the exciter field current is interrupted intermittently by the grid control action of the valves just as the resistor is open circuited in a vibratory regulator of the Tirrill type. The voltage across the resistor 44 remains practically constant for a given load condition and corresponds to the relatively fixed position of the contact carried by the alternating voltage lever of the Tirrill type of regulator, whereas the voltage component from the exciter rises and falls about a mean value similar to the vibration about a mean position of the contact carried by the direct current lever of the Tirrill type of regulator. This action causes the valves to shut off and on to maintain an average alternator excitation corresponding to the given load condition.

If the load on the alternator increases and the line voltage decreases from the value to be maintained there is a large change in the voltage across resistor 44, which corresponds to the large movement of the alternating current operated contact of the Tirrill type of regulator for a small change in voltage. This action means that the exciter voltage does not have to vary as far from the mean value before the valves are full on so that the valves are on for a greater period of time than they are off. In other words, the ratio of time-closed to time-opened of the valves is increased and the mean average excitation of the alternator is increased to maintain the alternator voltage for the new load condition. For a decrease of load and an increase in terminal voltage above the normal value the exciter voltage must vary farther from the mean value before the valves are full on so that the valves are off for a greater period than they are on. In other words, the ratio of time-closed to time-opened of the valves is decreased and the mean average excitation of the alternator is decreased to maintain the alternator voltage for the new load condition.

Upon the occurrence of a single phase short circuit in the circuit 2 or any fault condition resulting in an unbalance in the voltages of the circuit 2, the anode excitation of the amplifier circuit is decreased to such an extent that the potential across resistor 14 is immediately decreased to a value permitting the valves 6, 7 and 8 to be full on and apply full excitation to the alternator and thereby enable the alternator to remain in synchronous operation during the fault.

In Fig. 2 of the accompanying drawings I have illustrated an embodiment of my invention which differs from that of Fig. 1 in that the single phase static voltage determining and control circuit is replaced by a three phase movable device which is operative under balanced or unbalanced conditions to effect proper control of the valves 6, 7 and 8 by shifting the phase of the potential between the control electrodes and the anodes.

Since the valves 6, 7 and 8 are preferably of the discontinuous control type of electric discharge device in contradistinction to the continuous control type of valve represented by the high vacuum tube, such as the devices 28 and 29 or 48 and 49, a change in magnitude of the potential of the control electrodes after the valves have started conducting will not affect the output until the anode potential is reduced below its critical value. Roughly speaking, if the grid potential is negative, the anode current will not start to flow but as soon as the grid voltage becomes positive, provided the anode voltage is positive, anode current will flow. Therefore, if the phase relationship of the anode and grid voltage is varied, it means that the grid voltage does not go positive at the same time as the anode voltage. If this is the case, since positive power output can only flow when anode current flows and the anode is positive, the average value of this power will be a function of the time in each particular cycle during which the grid is positive. Therefore, the average value of the power output will decrease the more the grid voltage approaches the maximum out-of-phase relation.

The control electrodes of the valves are connected to be energized through a phase control device 59 comprising a polyphase rotor winding 60 connected to the circuit 2 and a polyphase stator winding 61 having its free terminals connected to the respective control electrodes through resistors 15, 16 and 17 and its neutral connected to the cathodes. The rotatable member 60 is actuated by a polyphase dynamo-electric device 62 which responds properly under balanced or unbalanced conditions in the circuit 2 to control the output of the valves. Preferably I employ a polyphase device of the type described and claimed in United States Letters Patent 1,743,798, granted January 14, 1930 upon an application of Robert H. Park. The device 62 which in the form illustrated comprises a stationary polyphase primary winding 63 for producing a rotating magnetic field and a rotatable closed circuit secondary or induced winding 64. The winding 63 is connected to be energized from all of the phases of the circuit 2 through adjustable resistances 65 and fixed resistors 66. The adjustable resistors form a convenient means for adjusting the value of the voltage to be regulated, and alone or in combination with the fixed resistance give the primary circuit a resistance characteristic so that the regulating action is not affected by variations in frequency of the line 2. The rotatable member 64 is mechanically connected by means of the shaft 65' to actuate the rotatable member 60 of the phase changing device. The torque of the rotatable member 64 is counterbalanced by the torque of a spring 66'. The winding 63 is arranged on the inner periphery of a stator core member of the type employed for induction motors in the usual manner of a distributed winding, and the rotor member 64 is preferably constructed in the form of a hollow steel shell. The dynamo-electric device 62 is so arranged that a small variation in line voltage will cause a predetermined variation in angular movement of the rotor. For example, 5 mechanical degrees for 1% variation in line voltage. The phase shifting device is provided with a large number of poles so that with 5 mechanical degrees angular variation in the rotor of the device 62 the electrical displacement in the phase shifting device may be as much as 90 electrical degrees. Since the electric valves are supplying current to a highly inductive circuit, a 90 degree phase shift of the control electrode voltage will cause the output of the valves to vary from practically zero to the maximum value.

The motion of the shaft 65' is modified by damping means connected thereto and shown as a dashpot comprising a cylinder 67 and a piston 68. The piston 68 is connected to the shaft 65 by resilient means such as a spring 69 in order to permit a quick change in the position of the rotor 60 on sudden changes in the regulated characteristic followed by a damping action after the spring is stressed a predetermined amount. Anti-hunting means are provided by connecting the plunger 70 of electromagnetic means to the cylinder of the dashpot. A winding 71 for actuating the plunger 70 is connected to be energized in accordance with an electrical characteristic of the excitation circuit and preferably, as illustrated, is connected to be responsive to the voltage of exciter 4. The winding 72 which is an additional anti-hunting means is connected to be energized from a source of substantially constant potential and as shown is connected for convenience across the exciter 58. This arrangement furnishes a stable anti-hunting means and positive action even though the field excitation of machine 1 operating as a synchronous condenser is reduced substantially to zero. Under unbalanced conditions with the type of polyphase actuating device illustrated the phase voltage or the line-to-line voltage of the device 62 will contain specific, symmetrical positive and negative phase sequence components but the torque of the motor will be substantially proportional to the difference between the squares of the magnitude of the positive sequence component and the negative sequence component so that the resultant torque immediately changes to permit the rotor 60 to be moved under the bias of spring 69 to a position such that the valves are rendered fully conducting.

The operation of the embodiment illustrated in Fig. 2 is substantially as follows: It will be observed that the rotor of the polyphase device 62 is restrained from moving by means of the spring 66' so that for a particular value of line voltage the device 62 will be in balance. If the line voltage deviates from this value, the rotor of the device 62 and the rotor of the phase shifting device which is connected mechanically to it will move through a small angle. I ue to the large number of poles on the phase shifting device, this small movement is sufficient to change the phase of the output voltage of the phase changing device through a sufficient number of electrical degrees so as to increase or decrease the valve output the proper amount to compensate for the deviations of the regulated voltage, thereby tending to maintain this voltage constant.

While I have shown and described particular embodiments of my invention it will be obvious to those skilled in the art that changes and modifications may be made without departing from my invention and I, therefore, aim in the appended claims to cover all such changes and modifications as fall within the true spirit and scope of my invention.

What I claim as new and desire to secure by Letters Patent of the United States, is,—

1. In combination, a polyphase alternating current circuit, an electric valve for controlling an electrical characteristic of said circuit, and polyphase means substantially simultaneously responsive to an unbalanced condition of said electrical characteristic and operative before said characteristic in any one phase decreases to a value substantially less than the normal balanced value for controlling said valve.

2. In combination, a polyphase alternating current dynamo-electric machine, an excitation circuit therefor, an electric valve for controlling the energization of said excitation circuit, and means comprising a polyphase winding responsive to unbalanced voltages in said machine for controlling said valve to change abruptly the energization of said excitation circuit.

3. In combination, a polyphase alternating current generator, an electric valve for controlling the voltage of said generator, and means comprising a polyphase winding connected to said generator and operative in accordance with a predetermined unbalance between voltages of the respective phases of said generator for abruptly increasing the conductivity of said valve to its maximum value.

4. The combination of an alternating current circuit, means comprising an electric valve for controlling said circuit, and means operative in accordance with the magnitude of a predetermined harmonic voltage of said circuit for controlling said valve.

5. The combination of a three phase dynamo-electric machine, an electric valve for controlling an electrical characteristic of said machine, and a three phase transformer having a primary winding connected to said machine and an open delta connected secondary winding for controlling said valve.

6. The combination of an alternating current circuit, means comprising an electric valve having a control electrode, for controlling an electrical characteristic of said circuit, means connected to said circuit comprising an electric discharge device having a grid, for controlling an electrical condition of the control electrode of said valve, and means interposed between said alternating current circuit and the grid circuit of said discharge device for modifying the potential thereof in accordance with a predetermined harmonic voltage of said circuit.

7. The combination of an alternating current dynamo-electric machine, means comprising an electric valve having a control electrode, for controlling an electrical characteristic of said machine, means connected to said machine comprising an electric discharge device having an anode circuit for controlling the potential of the control electrode of said valve, and means comprising a polyphase winding connected to said anode circuit for interposing therein a voltage which is equal to the arithmetical sum of a plurality of voltages, each proportional to a different phase voltage of said machine, which are harmonics of the fundamental voltage of said machine.

8. The combination of a three phase dynamo-electric machine, an electric valve having a control electrode, for controlling the voltage of said machine, means connected to said machine comprising an electric discharge device having an anode circuit for controlling the potential of the control electrode of said valve, a three phase transformer having a primary winding connected to said machine and an open delta connected secondary winding connected to the anode circuit of said electric discharge device.

9. In combination, a polyphase alternating current machine comprising excitation and armature circuits, a voltage determining circuit connected to said armature circuit and arranged to furnish a difference voltage varying in accordance with variations in the voltage of said armature circuit above or below a predetermined value, means for rectifying said difference voltage, means for combining said rectified voltage and a voltage component varying in accordance with the voltage of said excitation circuit, an amplifier comprising an electric discharge device provided with an anode circuit and a control grid, said control grid being connected to be energized in accordance with the resultant voltage of said combined rectifier and excitation voltage components, means for delaying the variations of the voltage of said grid, means for modifying the effect of said delaying means, an electric valve for controlling the energization of said excitation circuit to control the voltage of said armature circuit, means for controlling said electric valve in accordance with variations in the anode current of said electric discharge device, and means operative in accordance with a harmonic voltage of said armature circuit for modifying the control of said electric valve.

10. In combination, a polyphase generator comprising excitation and armature circuits, a voltage determining circuit connected to said armature circuit and arranged to furnish a difference voltage varying in accordance with variations in the voltage of said armature circuit above or below a predetermined value, means for rectifying said difference voltage, means for combining said rectified voltage and a voltage component varying in accordance with the voltage of said excitation circuit, an amplifier comprising an electric discharge device provided with an anode circuit and a control grid, said control grid being connected to be energized in accordance with the resultant voltage of said combined rectifier and excitation voltage components, means for delaying the variations of the voltage of said grid, means for modifying the effect of said delaying means, a three phase transformer having a primary winding connected to said armature circuit and an open delta connected secondary winding connected to energize said anode circuit, an electric valve for controlling the energization of said excitation circuit to control the voltage of said generator, and means traversed by the anode current of said discharge device for controlling said electric valve.

11. In combination, a polyphase alternating current circuit, an electric valve comprising an anode and a control electrode for controlling an electrical characteristic of said circuit, rotatable means for varying the phase relation between the potentials of said control electrode and anode, and a polyphase dynamo-electric device connected to be responsive to said electrical characteristic for actuating said rotatable means.

12. In combination, a polyphase alternating current circuit, an electric valve comprising an anode and a control electrode for controlling an electrical characteristic of said circuit, rotatable means for varying the phase relation between the potentials of said control electrode and anode, and dynamo-electric means comprising a polyphase primary winding and a closed circuit secondary member for actuating said rotatable member.

13. In combination, a polyphase alternating current dynamo-electric machine comprising an armature circuit and an excitation circuit, an exciter connected to said excitation circuit, a field winding for said exciter, an electric valve comprising an anode and a control electrode for controlling the energization of said field winding, rotatable means for controlling the phase relation between the potentials of said control electrode and anode, dynamo-electric means comprising a polyphase primary winding connected to said armature circuit and a closed circuit secondary member for actuating said rotatable member, and means responsive to variations in an electrical characteristic of said exciter for modifying the movement of said rotatable member.

14. In combination, a polyphase alternating current generator comprising an armature circuit and an excitation circuit, an exciter connected to said excitation circuit, a field winding for said exciter, an electric valve comprising an anode and a control electrode for controlling the energization of said field winding, rotatable means for controlling the phase relation between potentials of said control electrode and anode, a polyphase torque motor for actuating said rotatable member, means responsive to variations in the voltage of said exciter for modifying the movement of said rotatable member, damping means connected between said excitation controlled means and said rotatable member, and resilient means interposed between said damping means and said rotatable member.

GEORGE W. GARMAN.